Oct. 18, 1960 T. R. LONG ET AL 2,957,164

FERROELECTRIC STORAGE DEVICE

Filed May 22, 1958

INVENTORS T. R. LONG
R. M. WOLFE
BY R. C. Winter
ATTORNEY 2,957,164

FERROELECTRIC STORAGE DEVICE

Thomas R. Long, Bridgewater Township, Somerset County, and Robert M. Wolfe, Colonia, N.J., assignors to Bell Telephone Laboratories, Incorporated, New York, N.Y., a corporation of New York Filed May 22, 1958, Ser. No. 737,095

17 Claims. (Cl. 340—173.2)

This invention relates to electrical storage devices and more particularly to information storing devices and circuits in which the storage element comprises a ferroelectric element.

Ferroelectric elements or crystals, such as barium titanate, exhibit certain dielectric properties which are in many ways analogous to the magnetic properties of ferromagnetics. Just as ferromagnetic materials display a hysteresis effect in the relationship of magnetic induction and field, ferroelectrics in certain temperature ranges exhibit hysteresis in the relation of dielectric displacement and applied electric field.

In its ferroelectric phase a crystal is spontaneously electrically polarized. The most important property of a ferroelectric is that the direction of polarization can be altered by an applied electric field. Thus condensers comprising a slab of ferroelectric material and a pair of electrodes on opposite faces of the slab may be utilized to particular advantage as memory or storage elements when the ferroelectric is operated within the prescribed temperature range.

The operation of such condensers for this purpose involves, in general, polarizing the ferroelectric in one direction to store one type of binary information, applying a pulse of one polarity to reverse the polarization, whereby the opposite type of information is stored, and applying a read out pulse of the opposite polarity which serves to restore the initial polarization and thereby provide an output pulse indicative of the stored information. The storage provided in this manner is temporary in the sense that information stored by a polarization reversal from a first to a second stable state is destroyed by the interrogating signal which restores the polarization to the first stable state. Thus to permit subsequent interrogation of the element for the same information, the information must be "rewritten" in the element after each interrogation.

It is an object of this invention to provide an improved storage circuit.

More specifically, it is an object of this invention to provide an improved storage circuit including ferroelectric memory elements.

It is another object of this invention to improve the speed of operation of ferroelectric storage systems.

It is another object of this invention to provide a ferroelectric storage system displaying nondestructive read out.

Memory systems employing ferroelectric capacitors utilize an input signal of one polarity to generate both types of stored binary information. The "noise" signal, generated by shuttling of a capacitor; i.e., driving it from one stable state of remanent polarization into saturation in the same polarity, may represent a stored binary "zero." Complete polarization reversal between the second stable remanent state and saturation in the opposite polarity produces an indication of the other type of stored binary information; viz., a binary "one." A prerequisite of such operation is that the ratio of "one" signal to "zero" signal, referred to as the signal-to-noise ratio, must be sufficient to permit accurate detection by the memory output circuitry.

We have found that the speed of operation can be measurably improved by incorporating the technique of partial polarization reversal to supply the reversal "one" signal, which technique maintains a sufficient signal-to-noise ratio to facilitate memory operation while reducing the time required to produce the reversal signal. Such partial polarization reversal is achieved by properly limiting the magnitude and duration of the applied signals.

Of course, such partial polarization reversal alone will not provide complete nondestructive read out in storage systems, since as known in the art, partial polarization reversal of a ferroelectric will leave it in the partially polarized state upon removal of the applied signal. Application of a succession of such signals would eventually result in complete polarization reversal, whereupon the output signal derived from such applied signals would be identical to the "noise" signal due to shuttling of the ferroelectric, and it would no longer be possible to distinguish between the stored binary "one" and "zero." Such partial polarization reversal with stability in the partially polarized state is advantageous in counter operations as disclosed, for example, in R. M. Wolfe Patent 2,854,590, issued September 30, 1958, and for a limited number of repeated "read out" operations in binary storage operations as disclosed, for example, in Patent 2,717,372 of J. R. Anderson, issued September 6, 1955.

We have found in accordance with our invention that, under certain conditions, the partial polarization reversal of a ferroelectric in the manner described fails to leave the ferroelectric in the partially polarized state. Rather, the ferroelectric will automatically restore itself or backswitch to the condition of stable remanent polarization existing prior to application of the partial reversal signal. Such results may be produced throughout the partial reversal range required to maintain adequate signal-to-noise ratio in the output circuitry. The conditions under which this phenomenon occurs may be readily controlled such that completely nondestructive read out from ferroelectrics utilized in binary storage applications may at last be realized.

The increased speed of operation may be readily appreciated. Whereas considerable additional delay in the prior art systems was incurred in rewriting the information destroyed by polarization reversal read out, in accordance with our unique nondestructive read out system, this delay for rewriting information after each read out operation is obviated.

In accordance with one embodiment of our invention, nondestructive read out is further enhanced by the application of a small bias to the ferroelectric. We have found that such bias will fail to reverse polarization and will safeguard the desirable nondestructive property regardless of the number of successive read outs of the same information from the ferroelectric.

The nondestructive property of ferroelectrics exists only in a certain portion of the ferroelectric phase of the crystal being utilized. Thus by selecting the temperature for operation within this portion of the ferroelectric phase, the ferroelectric may be employed, in accordance with our invention, as a vital element in a nondestructive read out, memory system. We have found that the critical portion of the ferroelectric phase is limited by certain temperature dependent characteristics of the ferroelectric crystal and is best defined in such terms, since the temperatures at which they occur in various ferroelectric materials are not identical.

As noted hereinbefore, ferroelectric behavior appears only in certain temperature ranges, depending upon the material involved. Some ferroelectrics, such as Rochelle salt or RS, exhibit a single ferroelectric phase while others, such as barium titanate, exhibit three distinct ferroelectric phases. The transition temperature beyond which ferroelectrics are no longer polar is called the Curie temperature or Curie point. The Curie point marks the upper limit of the high temperature ferroelectric phase of crystals exhibiting more than one ferroelectric phase and the upper and lower limits of some single ferroelectric phase crystals. The phase and Curie point with which we are particularly concerned are the upper limit Curie point and the adjacent ferroelectric phase. Reference hereinafter to the ferroelectric phase and the Curie point will bear these connotations.

The dielectric constant in the ferroelectric phase is linearly related to the slope of the ferroelectric hysteresis curve, and is measured with a small applied field so as to avoid interference from the domain structure of the ferroelectric. The dielectric constant, generally quite high in the ferroelectric phase, rises to a peak at the Curie point. Characteristically, the spontaneous polarization declines from a high level in the lower temperature range of the ferroelectric phase to zero at the Curie temperature.

We have found, in accordance with our invention, that the property of nondestructive read out may be realized by establishing the operating temperature of the ferroelectric crystal in that portion of the ferroelectric phase below the Curie point in which the spontaneous polarization is decreasing with respect to increasing temperature and the dielectric constant is not decreasing with respect to increasing temperature. In other words, the effective operating range includes that temperature range adjacent the Curie point in which the derivative of the spontaneous polarization with respect to temperature is negative and the derivative of the dielectric constant with respect to temperature is not negative.

It is a feature of this invention that a ferroelectric capacitor be connected between a pulse source and a binary signal detecting device in which the pulse source furnishes signals insufficient to completely reverse the polarization of the ferroelectric device.

It is a more particular feature of this invention that sufficient polarization be reversed by the applied pulses to permit the output circuitry to distinguish between the two types of binary information stored in the ferroelectric capacitor.

It is another feature of this invention that the operating temperature of the ferroelectric capacitor be established within a range which will permit back-switching of the ferroelectric capacitor from a partially polarized state.

It is a more particular feature of this invention that the operating temperature of the ferroelectric capacitor be established in that portion of the ferroelectric phase adjacent the Curie point in which the dielectric constant is increasing with respect to increasing temperature and the spontaneous polarization is decreasing with respect to increasing temperature.

It is a feature of one embodiment of this invention that the ferroelectric capacitor is continuously biased from a position of stable remanent polarization.

A complete understanding of this invention and of the various features thereof may be gained from the following detailed description and the accompanying drawing, in which.

Figure 2:
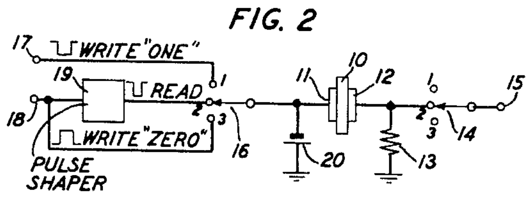
Fig. 2 is a diagram of a basic memory circuit utilizing a ferroelectric storage condenser.
Figure 3:
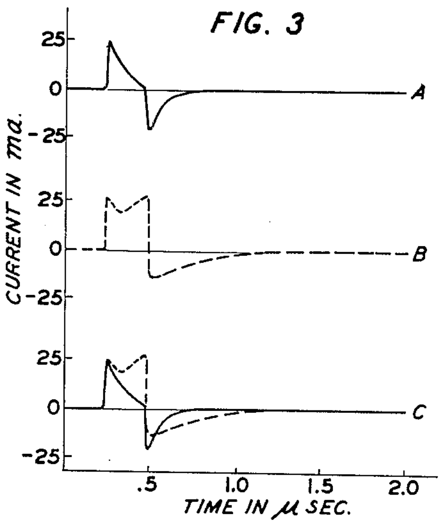
Figure 4A:
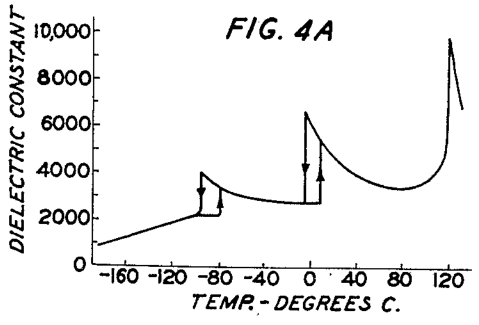
Figure 4B:
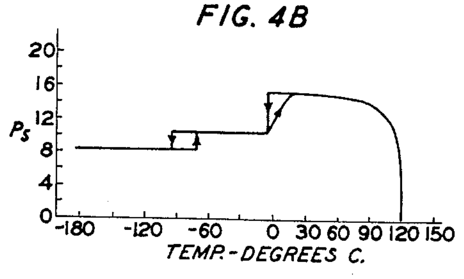

Fig. 3 exhibits graphically the output signals derived from operation of the circuit of Fig. 2; and Fig. 4 exhibits graphically certain operating characteristics of barium titanate.

Figure 1:
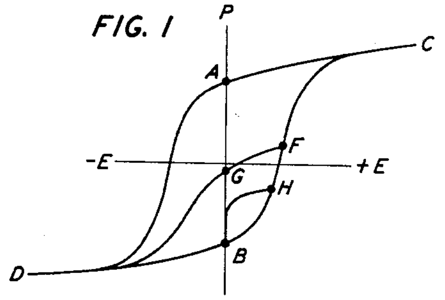
Fig. 1 is a typical hysteresis loop of a ferroelectric storage element indicating various conditions of polarization.

Referring now to Fig. 1, there is depicted a ferroelectric hysteresis loop in which the abscissa is the applied electric field and the ordinate is the resultant spontaneous polarization.

Starting from zero field and polarization at point B, the ferroelectric under the impetus of a positive field will be polarized positively following the hysteresis curve upward. The curve rises to the right with an initial gradual slope which becomes more pronounced as it approaches saturation at C. Upon removal of the applied positive field a finite value of the polarization remains, called the remanent polarization. As the ferroelectric without applied field will remain in this polarized condition, the point A is referred to as a stable point of remanent polarization.

Intermittent application of positive field strength thereafter will serve to reverse the polarization again to point C and continue to vary the polarization between points A and C. Analogous to ferromagnetics this excursion between A and C is referred to as "shuttling." A negative field of sufficient coercive strength will reverse the polarization from point A to saturation in the opposite polarity at point D, and subsequent removal of the field will cause the ferroelectric to relax into a second stable state of remanent polarization at point B.

Binary storage and read out now becomes apparent. Considering an output signal due to shuttling between A and C as an indication of one type of binary information, and an output signal due to complete polarization reversal between B and C as an indication of the other type of binary information, the ferroelectric need only be set to one or the other stable state of remanent polarization reversal by a "write in" signal and interrogated by a "read out" signal, the output indication of shuttling or polarization reversal determining the priorly stored information.

Assume, for example, that the ferroelectric at stable state A, as established by a positive "write in" signal, represents a stored "zero" and at stable state B, as established by a negative "write in" signal, a stored "one." Interrogation by a positive "read out" signal of the ferroelectric in the "zero" state at point A will produce a shuttle between A and C and a consequent "noise" output, in this instance indicating the stored "zero." Interrogation by the same positive "read out" signal with the ferroelectric in the "one" state at point B will produce a larger output signal than the noise output, due to complete polarization reversal from B to C. By discriminating between the amplitude of the complete reversal and noise output signals the stored information is readily ascertained.

Heretofore, it was believed that polarization reversal necessarily destroyed the priorly stored information, and memory systems were required to include a "rewrite" cycle after each "read out" cycle of operation in order to restore information which was to be read out subsequently. Such a procedure relegated ferroelectrics to temporary memory applications, and with the rewrite cycle required, the operating time of such memory systems was not remarkable.

Considering, now, the possibilities of partial polarization reversal and its effect upon ferroelectric memory operation, we have found, in accordance with the invention, that the application of an input signal to the ferroelectric which establishes a field of sufficient magnitude for complete polarization reversal but which is applied for insufficient duration to achieve such complete reversal will shift the ferroelectric to a partially polarized state such as point F in Fig. 1. Various combinations of input signal magnitude and duration may be employed to realize such partial polarization reversal. The important advantage of partial polarization reversal for memory applications is increased read out speed without loss of discrimination.

It is to be noted, however, that such partial polarization reversal is known to leave the ferroelectric in a partially polarized state upon removal of the applied field, such as point G in Fig. 1. R. M. Wolfe, Patent 2,854,590, cited hereinbefore, relies upon partial switching stability in a ferroelectric pulse counter. For counter operation the presence of stable partial remanence states is essential. Consecutive applications of the field in the same polarity must continue to reverse successive portions of the polarization, such that an oppositely directed field applied subsequently will reverse all of the polarization priorly reversed by the counting pulses and permit an indication of the number of polarization reversal steps. Anderson Patent 2,717,372, cited hereinbefore, utilizes partial polarization reversal for ferroelectric memory operation but is limited in the number of partial polarization reversal interrogations which can be made prior to complete polarization reversal, at which time the stored information is destroyed and must be rewritten to permit subsequent interrogation.

In occordance with our invention, we have discovered that ferroelectrics in which a portion of the polarization is reversed will, under particular conditions, automatically restore or "back-switch" to the original stable state of remanent polarization upon removal of the applied field. The dramatic effect of this discovery upon ferroelectrics employed in memory systems is immediately apparent. Not only is the time of operation improved by partial rather than complete polarization reversal, but the automatic back-switching characteristic obviates the need for a rewriting cycle to restore the ferroelectric to the stable remanent state from which it was moved by the interrogating signals. Thus the device provides nondestructive read out and is available for use as a high speed, permanent storage device.

In this instance a ferroelectric in which polarization is reversed from position B to position H, for example, will restore itself to position B upon removal of the applied field rather than relaxing to a stable, partially polarized state where application of an oppositely directed field would be required to restore the ferroelectric to the desired state of remanent polarization at point B.

A basic memory circuit illustrating the storage and read out of binary digits "one" and "zero" is shown in Fig. 2 and is not unlike such circuits disclosed in the prior art; e.g., the aforementioned J. R. Anderson patent. The circuit comprises a ferroelectric crystal 10 to the opposite sides of which are affixed electrodes 11 and 12, forming an element which may be considered as a condenser having a ferroelectric dielectric. Electrode 12 is connected in series with resistor 13 to ground. A signal appearing across resistor 13 is supplied at output terminal 15 through a switching arrangement 14, which is connected only during the reading operation.

Positive or negative input signals of suitable magnitude and duration may be applied to electrode 11, through the appropriate contact on switch 16 operated in synchronism with switch 14, to drive the ferroelectric to partial or complete saturation in either polarity. The input signal sources may be conventional pulse generators as known in the art. The "write in" signals, which are sufficient to provide complete polarization reversal, are available in opposite polarities at terminals 17 and 18. The input signals applied to terminal 18 are also coupled to the input of pulse shaper and limiter circuit 19, to provide pulses suitable for partial polarization reversal as required in accordance with this invention. Circuit 19 is illustrated in block form as such circuits are conventional in the art and, per se, form no part of the present invention.

In describing the operation of the illustrative circuit, it may be assumed that the ferroelectric storage element 10 is initially in remanent polarization state A, Fig. 1, representing a stored "zero" and that it is desired to store a "one," represented by state B. Switch 16 is moved to contact 1 and a negative "write in" signal is applied to electrode 11 so as to drive the ferroelectric 10 to saturation in negative polarity at D. When the applied signal is reduced to zero, the ferroelectric 10 moves to stable remanent condition B, thereby completing the operation for storage of a "one." No external charge remains on the plates 11 and 12 but the remanent polarization of the stable condition at point B persists within the ferroelectric while voltage across the ferroelectric has returned to zero. The "one" will remain stored therein for prolonged periods of time without substantial decay.

When it is desired to interrogate the ferroelectric to determine its information content, switches 14 and 16 are moved to position 2, such that a positive signal, suitably shaped and limited in circuit 19, is applied to the ferroelectric 10. If the ferroelectric 10 is storing a "zero" at this time, the polarization will be shuttled between point A and point C. If a "one" is stored at this time the polarization will be reversed from point B toward saturation in the opposite polarity at C. However, the input signal being of insufficient magnitude and duration to completely reverse the polarization of the ferroelectric, reversal will continue to some partial polarization position such as H whereupon removal of the applied positive signal allows the ferroelectric to back-switch to position B.

Out put signals indicating the stored "one" and "zero" are thus both positive in this instance. However, the signal derived from polarization reversal between B and H will have a larger amplitude at a discrete point in the reading interval than will the signal derived from the shuttling excursion between A and C. Thus, detection of the signal amplitudes by appropriate output circuitry will serve to distinguish the former signal, indicating a stored "one," from the latter signal, indicating a stored "zero."

In view of the back-switching encountered in the polarization reversal between positions B and H, nondestructive read out is realized. Thus the ferroelectric may be interrogated during successive reading intervals to detect the presence of a stored "zero" or "one" without necessitating intermediate rewriting of a stored "one."

Fig. 3 represents the output signals derived from a .005 inch thick crystal of triglycine sulfate (TGS) with an electrode area of .005 square inch as the memory element in series with a 200 ohm resistor. The crystal was held at 40 degrees centigrade. The signal represented in Fig. 3A was derived from the application of a 20 volt one-half microsecond positive pulse applied to the triglycine sulfate crystal in a positive state or point A in Fig. 1. Thus the output signal represented in Fig. 3A is the "noise" signal indicative of a "zero" derived from shuttling of the ferroelectric between points A and C. The current flowing at the one-half microsecond time is close to zero, being less than two milliamperes.

In contrast, Fig. 3B indicates the application of a 20 volt one-half microsecond positive pulse to the ferroelectric 10 in the negative state B, tending to reverse the polarization of the ferroelectric toward saturation C in the opposite polarity. However, the magnitude and interval of application of the input pulse are insufficient to achieve complete polarization reversal and the ferroelectric is partially polarized to position H, for example, and back-switches automatically to position B. As noted in Fig. 3B, the current appears to follow a normal switching waveform until the termination of the input pulse, at which point the current immediately reverses, goes negative, and then falls back exponentially to zero, with a time constant of about two microseconds.

Superposition of the "zero" or "noise" pulse on the "one" output signal pulse, as shown in Fig. 3C, indicates the drastic difference in amplitude of the signals at the one-half microsecond interval, or large signal-to-noise ratio, such that distinction of the stored binary information by the output circuitry is easily implemented. Thus nondestructive read out utilizing partial polarization reversal of ferroelectric elements in memory systems for fast, permanent operation is realized.

As priorly noted, the particular operating conditions in which ferroelectric materials exhibit the backswitching essential to nondestructive read out in accordance with this invention include establishing the operating temperature of the ferroelectric within a range below the Curie temperature in which the spontaneous polarization is decreasing with respect to temperature and the dielectric constant is not decreasing with respect to temperature. The temperature control advantageously is implemented by immersion of the ferroelectric material in a liquid whose temperature is easily controlled, such as, for example, a silicon oil bath.

Fig. 4 illustrates the relationship of dielectric constant, measured perpendicular to the direction of polarization, and spontaneous polarization as functions of temperature in barium titanate to indicate graphically the operating range for nondestructive read out in accordance with this invention. Barium titanate exhibits three different ferroelectric phases in each of which the crystal-line symmetry is different; i.e., rhombohedral below −80 degrees centigrade, orthorhombic between −80 degrees centigrade and 5 degrees centigrade, and tetragonal between 5 degrees centigrade and the Curie point at 120 degrees centigrade. In this instance we are interested only in the tetragonal phase adjacent the Curie point wherein it is noted that the dielectric constant measured perpendicular to the direction of polarization declines as the temperature is increased to approximately 90 degrees centigrade and thereafter rises to a peak at the Curie point. Similarly the spontaneous polarization declines slightly with increasing temperature up to approximately 90 degrees centigrade and thereafter drops off rapidly to zero at the Curie point.

Thus the range within the ferroelectric phase in which the dielectric constant is not declining (Fig. 4A) and the spontaneous polarization is declining (Fig. 4B) with respect to increasing temperature occurs between approximately 90 and 120 degrees centigrade in barium titanate, the latter temperature being at the Curie point, and the nondestructive read out range is established between these temperatures. The lower limit of the nondestructive ferroelectric range may also be stated in terms of the spontaneous polarization alone as a function of temperature. We have found that the switch-back characteristic requisite to nondestructive read out is present in that portion of the ferroelectric phase adjacent the Curie point wherein the spontaneous polarization is decreasing at a rate greater than .5 percent per degree centigrade increase in temperature.

Our experiments with other ferroelectrics have proven the accuracy of these limits. Thus in triglycine sulfate (TGS), the range is between approximately 25 degrees centigrade and 47.5 degrees centigrade, while in guanidine aluminum sulfate hexahydrate (GASH), the effect is noted in the range of approximately 0 degrees centigrade to 40 degrees centigrade.

In accordance with one aspect of this invention, a source of steady state potential depicted as battery 20 in Fig. 2 is provided to establish a small, continuous bias on the ferroelectric 10 insufficient to permit polarization reversal but highly advantageous in maintaining complete nondestructibility of the memory read out operation. Thus it has been noted that polarization decay may occur from continuous read out of a "one" with a partial switching signal. However, with the slight bias provided by battery 20, an infinite number of read out signals may be applied without fear of the occurrence of destructive read out.

It is to be understood that the above-described arrangements are illustrative of the application of the principles of the invention. Numerous other arrangements may be devised by those skilled in the art without departing from the spirit and scope of this invention.

What is claimed is:

1. In combination, a ferroelectric capacitor for storage of binary information, means applying pulses of one polarity to said capacitor, said capacitor having a first stable state of polarization corresponding to said pulse polarity and a second stable state of polarization opposite to said pulse polarity, output means receiving a first output signal from said capacitor indicative of one type of stored binary information upon application of one of said pulses to said capacitor in said first state and receiving a second output signal from said capacitor indicative of the other type of stored binary information upon application of one of said pulses to said capacitor in said second state, and means for assuring receipt by said output means of said second signal upon application to said capacitor initially in said second state of a succession of more of said pulses than required to reverse the polarization to said first state, said last-mentioned means comprising means for controlling the operating temperature of said capacitor.

2. A storage device for nondestructive read out of binary information comprising a capacitor having a dielectric of ferroelectric material, means for applying an input signal to said capacitor to reverse the polarization of said ferroelectric material from a stable state of remanent polarization, means for sensing output signals resulting from said polarization reversal, and means for establishing the operating temperature of said ferroelectric material within a range in which the ferroelectric material is reversed to said stable state of remanent polarization upon removal of said input signal.

3. A storage device in accordance with claim 2 wherein said operating temperature range includes that portion of the ferroelectric phase in which said ferroelectric material exhibits a dielectric constant which is not decreasing with increasing temperature.

4. A storage device in accordance with claim 2 wherein said operating temperature range includes that portion of the ferroelectric phase in which said ferroelectric material exhibits a declining spontaneous polarization with increasing temperature.

5. A storage device in accordance with claim 4 wherein said operating temperature range includes that portion of the ferroelectric phase in which the spontaneous polarization is decreasing with respect to increasing temperature at a rate greater than one-half of one percent per degree centigrade.

6. A storage device in accordance with claim 2 wherein said operating temperature range includes a limited portion of the ferroelectric phase adjacent the Curie point.

7. A storage device in accordance with claim 6 wherein said operating temperature range includes that portion of the ferroelectric phase adjacent the Curie point in which the derivative of said material's spontaneous polarization with respect to temperature is negative and the derivative of said material's dielectric constant with respect to temperature is not negative.

8. A storage device in accordance with claim 2 further comprising means for biasing said capacitor out of stable remanent polarization.

9. A memory circuit comprising a ferroelectric capacitor having a polarization at one point on its hysteresis loop, means applying a pulse to said capacitor of opposite polarity to said polarization to cause said capacitor to move away from said point of polarization, means receiving an output signal from said capacitor on application thereto of said pulse, and means for controlling the operating temperature of said capacitor whereby said capacitor is returned to said polarization point upon removal of said pulse.

10. A storage circuit comprising a ferroelectric capacitor capable of selectively assuming one of two stable states of polarization representative of binary information, means for determining the particular stable state at which said capacitor exists comprising means for applying storage pulses of one polarity to said capacitor to polarize said capacitor to the first stable state and of opposite polarity to polarize said capacitor to the second stable state, means applying a read out pulse to said capacitor in said first stable state sufficient to polarize said capacitor to a point intermediate said two stable states, means receiving an output pulse from said capacitor on application thereto of said read out pulse, and means for controlling the operating temperature of said capacitor to restore said capacitor to said first stable state upon removal of said read out pulse.

11. A storage circuit in accordance with claim 10 wherein said temperature controlling means comprises means for establishing the operating temperature of said capacitor within a limited portion of the ferroelectric phase of said capacitor.

12. A storage circuit in accordance with claim 11 wherein said limited portion of the ferroelectric phase is adjacent the Curie point for the ferroelectric material of said capacitor.

13. A storage circuit in accordance with claim 12 wherein said limited portion of the ferroelectric phase exhibits a dielectric constant which is not decreasing with increasing temperature.

14. A storage circuit in accordance with claim 12 where in said limited portion of the ferroelectric phase exhibits a declining spontaneous polarization with increasing temperature.

15. A storage circuit in accordance with claim 14 wherein said spontaneous polarization is decreasing with respect to increasing temperature at a rate greater than one-half of one percent per degree centigrade.

16. A storage circuit in accordance with claim 10 further comprising means for continuously applying a steady state signal to said capacitor to bias said capacitor away from a stable state of remanent polarization.

17. A storage circuit comprising a ferroelectric capacitor capable of assuming two stable states of polarization representative of binary information, means for applying storage pulses to said capacitor to determine the particular stable state, and means for nondestructively sensing the state of said capacitor, said sensing means including means for applying partial switching pulses to said capacitor and means for controlling the temperature of said capacitor to be in the temperature range in which said capacitor automatically returns from its partially switched state to its prior stable state upon cessation of said partial switching pulse.

No references cited.